(12) United States Patent
Elyashiv et al.

(10) Patent No.: US 10,693,920 B2
(45) Date of Patent: Jun. 23, 2020

(54) SYSTEMS AND METHODS FOR SCREENING COMMUNICATION SESSIONS

(71) Applicant: Secure Connection Ltd., Bnei Brak (IL)

(72) Inventors: Tal Elyashiv, Ramat-HaSharon (IL); Yoseph Taguri, Tel-Aviv (IL); Shmuel Ur, Shorashim (IL)

(73) Assignee: SECURE CONNECTION LTD., Bnei Brak (IL)

( * ) Notice: Subject to any disclaimer, the term of this patent is extended or adjusted under 35 U.S.C. 154(b) by 536 days.

(21) Appl. No.: 14/827,391

(22) Filed: Aug. 17, 2015

(65) Prior Publication Data
US 2016/0323326 A1  Nov. 3, 2016

Related U.S. Application Data

(63) Continuation-in-part of application No. 14/816,013, filed on Aug. 2, 2015, now Pat. No. 10,193,982.
(Continued)

(51) Int. Cl.
*H04L 29/06* (2006.01)
*H04M 3/42* (2006.01)
(Continued)

(52) U.S. Cl.
CPC .... *H04L 65/1076* (2013.01); *H04M 3/42374* (2013.01); *H04M 3/436* (2013.01); *H04M 7/006* (2013.01)

(58) Field of Classification Search
CPC ............ H04L 65/1076; H04L 65/1069; H04M 3/42374; H04M 3/436; H04M 7/006
(Continued)

(56) References Cited

U.S. PATENT DOCUMENTS 4,555,781 A * 11/1985 Baldry ................. H04M 11/085
345/2.2
5,467,388 A  11/1995 Redd, Jr. et al.
(Continued)

FOREIGN PATENT DOCUMENTS

CN  101426185  5/2009
CN  102055832  5/2011
(Continued)

OTHER PUBLICATIONS

Voipo, Great forwarding number for annoying calls, Dec. 2010, https://www.voipo.com/forums/showthread.php/2687-Great-forwarding-number-for-annoying-calls.*
(Continued)

*Primary Examiner* — James E Springer
(74) *Attorney, Agent, or Firm* — Pearl Cohen Zedek Latzer Baratz LLP

(57) ABSTRACT

There is provided a method for centralized screening of a communication session, comprising: receiving, at a server, a request from a caller client terminal, to establish a communication session with a callee client terminal; analyzing, by the server, the request according to a screening set-of-rules; and transmitting, from the server, a screening response to the caller client terminal according to the analysis, wherein the analyzing and the transmitting are performed by the server independently of at least one of real-time status of the callee client terminal and real-time response instructions from the callee client terminal.

26 Claims, 3 Drawing Sheets

Related U.S. Application Data which is a continuation-in-part of application No. 14/698,919, filed on Apr. 29, 2015, now Pat. No. 9,277,015.

(51) Int. Cl.
 *H04M 7/00* (2006.01)
 *H04M 3/436* (2006.01)

(58) Field of Classification Search
 USPC .......................................................... 709/204
 See application file for complete search history.

(56) References Cited

U.S. PATENT DOCUMENTS

| | | | |
|---|---|---|---|
| 5,566,236 A | 10/1996 | MeLampy et al. | |
| 6,198,916 B1 | 3/2001 | Martin et al. | |
| 7,233,788 B2 | 6/2007 | Kedem | |
| 7,818,003 B2 | 10/2010 | Callaghan | |
| 8,068,824 B2 | 11/2011 | Shan et al. | |
| 8,467,354 B1* | 6/2013 | Jerkunica | H04L 65/1053 370/338 |
| 8,831,591 B2 | 9/2014 | Kotecha et al. | |
| 8,897,786 B2 | 11/2014 | Ryu et al. | |
| 8,942,685 B2 | 1/2015 | Weksler et al. | |
| 2002/0009184 A1* | 1/2002 | Shnier | H04M 1/57 379/142.01 |
| 2002/0118807 A1* | 8/2002 | Pedersen | H04M 3/42382 379/142.01 |
| 2002/0146107 A1* | 10/2002 | Baals | H04M 3/428 379/215.01 |
| 2002/0161604 A1 | 10/2002 | Kardos et al. | |
| 2004/0229600 A1* | 11/2004 | Saez | H04M 3/436 455/417 |
| 2005/0141511 A1 | 6/2005 | Gopal | |
| 2005/0159138 A1 | 7/2005 | Florkey et al. | |
| 2005/0201362 A1* | 9/2005 | Klein | H04M 3/42161 370/352 |
| 2006/0129643 A1 | 6/2006 | Nielson et al. | |
| 2006/0183514 A1* | 8/2006 | Patton | B60R 11/0247 455/575.2 |
| 2007/0165554 A1* | 7/2007 | Jefferson | H04M 3/42263 370/315 |
| 2007/0165808 A1* | 7/2007 | Pieraccini | H04M 3/493 379/142.04 |
| 2008/0081627 A1 | 4/2008 | Shan et al. | |
| 2009/0049125 A1* | 2/2009 | Channabasavaiah | H04L 51/04 709/204 |
| 2009/0086953 A1* | 4/2009 | Vendrow | H04M 3/436 379/207.02 |
| 2009/0109961 A1 | 4/2009 | Garrison et al. | |
| 2009/0257576 A1* | 10/2009 | Wellard | H04M 3/42374 379/201.03 |
| 2010/0150332 A1 | 6/2010 | Soo et al. | |
| 2010/0189094 A1 | 7/2010 | Gray et al. | |
| 2011/0096673 A1 | 4/2011 | Stevenson et al. | |
| 2012/0008759 A1* | 1/2012 | Mcfeeters | H04M 1/663 379/213.01 |
| 2012/0100830 A1* | 4/2012 | Barber | H04M 3/42008 455/410 |
| 2012/0297368 A1* | 11/2012 | Bingell | H04L 12/54 717/126 |
| 2012/0321064 A1* | 12/2012 | Czachor, Jr. | H04M 3/436 379/210.02 |
| 2014/0341081 A1* | 11/2014 | Efrati | H04M 3/436 370/259 |
| 2014/0357237 A1* | 12/2014 | Bell | H04M 3/5335 455/413 |
| 2015/0023485 A1* | 1/2015 | Guarriello | H04M 3/42161 379/88.23 |
| 2016/0014274 A1* | 1/2016 | Joy | H04M 3/436 455/414.1 |
| 2016/0234667 A1* | 8/2016 | Kidron | H04W 4/16 |
| 2016/0323418 A1 | 11/2016 | Elyashiv et al. | |
| 2017/0134575 A1* | 5/2017 | Quilici | H04M 3/436 |
| 2017/0171387 A1* | 6/2017 | Vendrow | H04M 3/436 |

FOREIGN PATENT DOCUMENTS

| | | |
|---|---|---|
| WO | WO 98/57480 | 12/1998 |
| WO | WO 2013/181921 | 12/2013 |

OTHER PUBLICATIONS

Igor, Fun with Call Forwarding, Oct. 31, 2011, http://www.krazyworks.com/fun-with-call-forwarding/.*

Official Action dated Aug. 24, 2015 From the US Patent and Trademark Office Re. U.S. Appl. No. 14/698,919.

Droidural "Polite Call Reject, V1.1", SlideMe LLC, 3 P., Mar. 11, 2012.

Tacoty "Call Block [Block Call or SMS]—Android Apps on Google Play", Tacoty App, Google, 3 P., Jul. 8, 2015.

Zukerman "A Better Way to Block Unwanted Calls on Your Android Phone", Makeuseof, 4 P., Jun. 14, 2012.

Official Action dated Feb. 1, 2018 From the US Patent and Trademark Office Re. U.S. Appl. No. 14/816,013. (30 pages).

* cited by examiner

SYSTEMS AND METHODS FOR SCREENING COMMUNICATION SESSIONS

RELATED APPLICATIONS

This application is a Continuation in Part of U.S. patent application Ser. No. 14/816,013, filed on Aug. 2, 2015 and Ser. No. 14/698,919 filed on Apr. 29, 2015, the contents of which are incorporated herein by reference in their entirety.

BACKGROUND

The present invention, in some embodiments thereof, relates to a communication sessions and, more specifically, but not exclusively, to screening of communication sessions.

A user may screen incoming requests to establish a communication session (e.g., a phone ringing with a phone call, and/or an instant message application informing of a request to chat). The user may screen the calls from certain individuals, for example, by viewing the originator of the call (e.g., the phone number of the originating device, and/or the username of the instant message sender). The user may perform the screening action, for example, by ignoring the request (i.e., letting the phone ring until it stops, and/or not answering the request to chat), by pressing a button to hang-up the call, by forwarding the call to voice mail, or by turning off the phone.

SUMMARY

According to an aspect of some embodiments of the present invention there is provided a method for centralized screening of a communication session, comprising: receiving, at a server, a request from a caller client terminal, to establish a communication session with a callee client terminal; analyzing, by the server, the request according to a screening set-of-rules; and transmitting, from the server, a screening response to the caller client terminal according to the analysis, wherein the analyzing and the transmitting are performed by the server independently of at least one of real-time status of the callee client terminal and real-time response instructions from the callee client terminal.

Optionally, independently comprises without transmitting data related to the request to the callee client terminal.

Optionally, the callee client terminal is a registered user of the server, wherein the portion of the communication session between the server and the callee client terminal is established by the server.

Optionally, the method further comprises selecting different screening responses from a group of screening responses to provide to different request when the same caller client terminal issues a plurality of requests. Optionally, the method further comprises logging a history of communication session request data and associated transmitted screening responses, and selecting the different screening responses according to the logged history to prevent repeated same screening responses.

Optionally, the method further comprises selecting a certain screening response from a group of screening responses according to an emulated unavailable profile of the callee client device, the emulated unavailable profile including an emulation of non-available activities that a user of the callee client device is performing at least at the time the request is received. Optionally, the emulated unavailable profile is automatically learned based on an analysis of actual user non-available activities. Alternatively or additionally, the emulated unavailable profile is automatically generated based on an analysis of non-available entries in a calendar application installed on the callee client terminal. Alternatively or additionally, the emulated unavailable profile includes an emulation of the presence of the callee client terminal at least at one geographical location with unavailable or low quality connectivity. Alternatively or additionally, the emulated unavailable profile includes an emulation of the unavailability of the callee client terminal due to being abroad when the callee client terminal is actually local and available. Alternatively or additionally, the emulated unavailable profile includes at least one block of time manually defined by a user of the callee client terminal.

Optionally, the screening response transmitted by the server to the caller client terminal is different than a real-time usage state of the callee client terminal. Optionally, the screening response includes a plurality of unanswered rings when the real-time usage state includes another active communication session between the callee client terminal and a third client terminal.

Optionally, the screening response includes establishment of the communication session between the caller client terminal and the callee client terminal, and emulating a dropped call after establishment of the communication session.

Optionally, the screening response includes establishment of the communication session between the caller client terminal and the callee client terminal, and emulating a low quality communication session insufficient for complete transmission of voice data over the established communication session.

Optionally, the server coordinates screening responses for a plurality of callee client terminals.

Optionally, the method further comprises performing a machine learning analysis of a history of manual user actions of a user of the callee client terminal in response to incoming calls from caller client terminals, and automatically generating the set-of-rules according to the analysis. Optionally, the history of manual user actions includes a plurality of messaging service responses, and the machine learning analysis creates the set-of-rules to automatically reply with a message emulating a response of the user.

Optionally, the method further comprises automatically determining a relationship type between the caller and the callee, and selecting the screening response according to the relationship type.

Optionally, the screening response includes routing the request to another client terminal different than the callee client terminal, to establish a communication session with the other client terminal, emulating a mistaken communication address of the callee client terminal. Optionally, the another client terminal is selected from the group consisting of: a predefined client terminal used by a human operator that emulates a mistaken user, a randomly selected client terminal, and a client terminal having a communication address similar to a communication address of the callee client terminal.

Optionally, the screening response includes emulating establishment of the communication session with an incorrect client terminal emulated by the server, emulating a mistaken communication address of the callee client terminal.

According to an aspect of some embodiments of the present invention there is provided a system for screening of a communication session, comprising: a server comprising: a first communication interface for communicating with a caller client terminal; a second communication interface for communication with a callee client terminal; a program store storing code; a processor coupled to the first communication interface, the second communication interface, and the program store for implementing the stored code, the code comprising: code to receive, using the first communication interface, a request from a caller client terminal, to establish a communication session with a callee client terminal, analyze the request according to a screening set-of-rules; and transmit using the first communication interface, a screening response to the caller client terminal according to the analysis; wherein the analyzing and the transmitting are performed by the server independently of at least one of a real-time status of the callee client terminal and real-time response instructions from the callee client terminal.

Optionally, the request is received over a first communication segment between the caller client terminal and the server, the request including establishing of a second communication segment between the callee client terminal and the server and providing communication between the caller client terminal and the callee client terminal using the server using the first and second communication segments.

Optionally, communication interface resources of the callee client terminal are free while the server processes the request from the caller client terminal allowing establishing a second communication session between the callee client terminal and a third client terminal.

Optionally, the caller client terminal and the callee client terminal are connected to the server over a packet network, and the server attempts to establish the communication session as a voice over packet network phone call.

According to an aspect of some embodiments of the present invention there is provided a computer program product comprising a non-transitory computer readable storage medium storing program code thereon for implementation by a server, the program code comprising: instructions to receive a request from a caller client terminal to establish a communication session with a callee client terminal; instructions to analyze the request according to a screening set-of-rules; and instructions to transmit a screening response to the caller client terminal according to the analysis, wherein the analyzing and the transmitting are performed independently of at least one of real-time status of the callee client terminal and real-time response instructions from the callee client terminal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
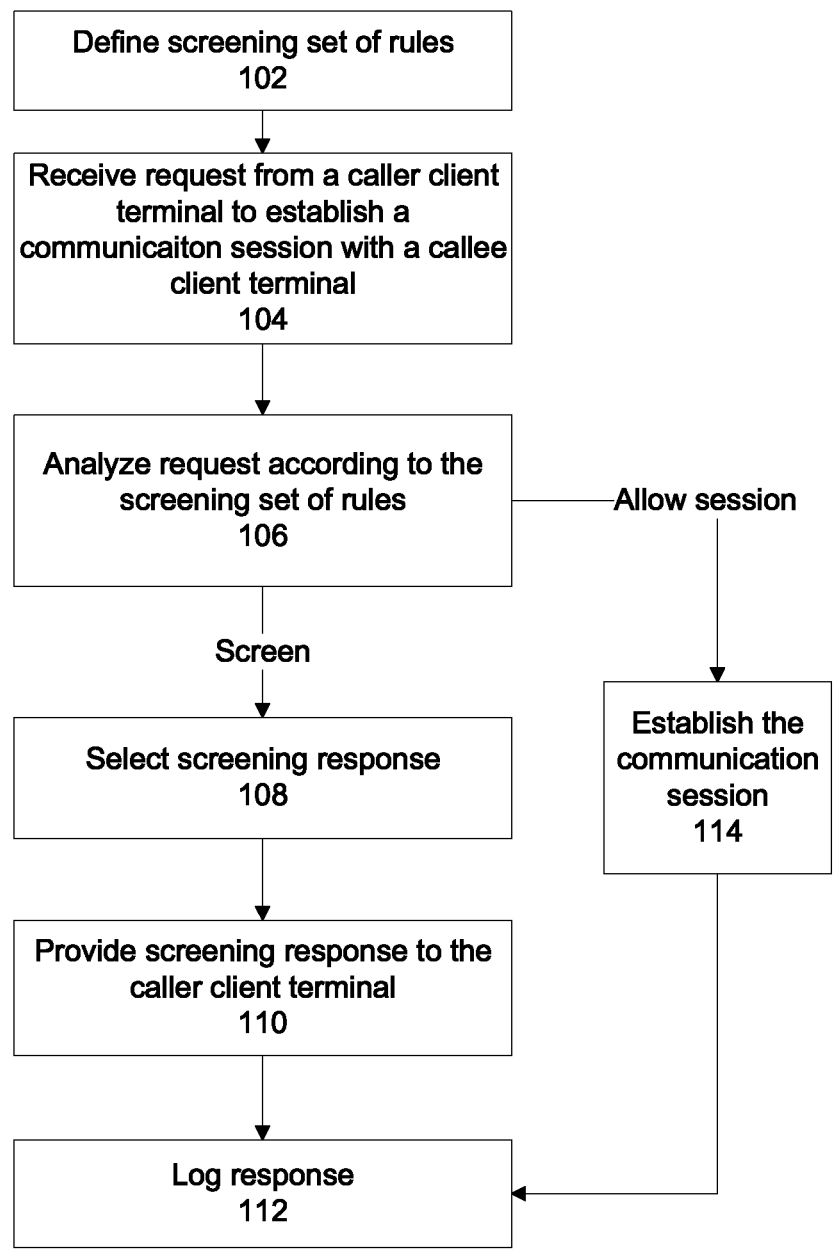
FIG. 1 is a flowchart of a method for centralized screening of communication sessions to a callee client terminal, performed by a network server, in accordance with some embodiments of the present invention.

The present invention, in some embodiments thereof, relates to a communication sessions and, more specifically, but not exclusively, to screening of communication sessions.

An aspect of some embodiments of the present invention relates to a server (and/or method implemented by the server) that responds to a request from a caller client terminal to establish a communication session with a callee client terminal (e.g., a phone call, a video call, and/or instant messaging session), with a screening response, the response being independent of the actual real-time status of the callee client terminal, and/or without receiving real-time instructions from the callee client terminal. The screening response emulates unavailability of the callee client terminal to establish the communication session with the caller client terminal, for example, a busy signal, unanswered rings, a dropped call, poor communication link quality, tone representing the callee is on another line, tone representing the phone is not in service (e.g., off, does not have service), and/or a forward to voicemail. Optionally, the server provides the response with the callee client terminal being unaware of the request. Optionally, data related to the request is processed by the server, without the request related data transmitted to the callee client terminal, for example, the phone at the callee end does not ring, and/or the callee client terminal does not provide the screening responses.

Optionally, client terminals are in communication with the server over a network, optionally a packet network, for example, the internet. The callee client terminal may be a subscriber to a communication service provided by the server. The caller client terminal may or may not be a subscriber to the service. When the caller client terminal attempts to establish the communication session with the callee, the request is forwarded to the server for processing, which establishes an independent communication segment with the caller client terminal. The server may or may not establish the communication session between callee and caller client terminals by linking the segment established with the caller to a segment established with the callee, optionally according to the screening set-of-rules. Optionally, the server provides the screening response to the requesting caller client terminal without establishing the link with the callee client terminal. In this manner, the server acts as an automatic screener for the callee client terminal, for example, the callee client terminal is not contacted and/or is not aware (e.g., in real-time) of the actual attempt by the caller client terminal and real-time screening response.

Optionally, the screening response provided by the server is different than the actual real-time state of the callee client terminal. For example, when the user of the callee client terminal is on another line, the server may provide the screening response of no service or unanswered rings, to emulate that the callee is unavailable, instead of providing the actual tone indicating that the user is on another line.

Such screening responses emulate that the user is unavailable when the user is actually available.

Optionally, communication resources of the callee client terminal are available to communicate with other client terminals (i.e., other than the requesting caller client terminal) while the server processes the request and provides the screening response. In this manner, for example, repeated unwanted attempts to establish communication sessions (e.g., repeat phone calls) do not result in repeated ringing of the callee's phone and/or do not tie up the phone line of the callee.

Optionally, the screening response is selected to reduce the perception of the user of the requesting caller client terminal that the screening response is a screen instead of the user of the callee client terminal being actually unavailable. Optionally, different screening responses are selected in response to different requests from the same caller client terminal. The different screening responses may help provide the perception that the user of the callee client terminal is unavailable, for example, a busy tone, a phone off tone, and emulation of poor connectivity are provided to different requests. The user of the callee client terminal may be unaware of the screen, as the user may not expect different tones representing unavailability of the user.

Optionally, the screening response provided by the server is selected from a group of screening responses according to an emulated unavailable profile. The emulated unavailable profile emulates activities that the user of the client terminal is performing that make the user non-available to accept communication session requests, for example, driving, working, sleeping, traveling, and in a meeting. The screening responses may be selected according to the emulated non-available activity, for example, emulated poor reception when driving, unanswered rings when sleeping, busy tone when working, and dropped calls when travelling. The emulated non-available activity may emulate non-available activities when the user is actually available. For example, when the user is abroad but able to receive calls with good quality reception, the profile may emulate that the user is abroad an unable to receive calls.

Optionally, the screening responses are automatically generated based on machine learning methods (e.g., statistical classifier), for example, based on a history of manual user responses to different caller client terminals (e.g., who the user answers and who the user ignores), based on an analysis of entries in a calendar application (e.g., the work hours of the user), and/or based on an analysis of geographical locations of the user (e.g., when the user travels in a tunnel every day, and one day the user doesn't travel in the tunnel, the tunnel travel may be emulated to provide an unavailable response). Machine learning methods may emulate replies by the user, for example, automatically creating text messages as replies based on learning of text messages that the user manually created.

Optionally, the server coordinates screening responses for a group of callee client terminals, to emulate unavailability of the group. For example, during a company meeting, the server may provide screening responses for the employees of the company attending the meeting.

Optionally, the server emulates a mistaken communication address of the callee client terminal, for example, a mistaken phone number, and/or a correct phone number that is not associated with the right end user such as a re-assigned phone number. The server may route the request to a different client terminal (i.e. other than the intended callee client terminal), which may be, for example, a random client terminal, a client terminal having a similar communication address (e.g., one digit different in phone number), a predefined client terminal used by a human operator that emulates a mistaken user (i.e., part of the provided screening service). The server may simulate the different client terminal, for example, by playing an answering machine with a voice repeating an incorrect phone number.

The history of communication session requests and associated transmitted screening responses may be logged. The log may be analyzed to determine future screening responses that emulate unavailability, for example, to prevent repetition of the same response, to prevent a pattern of improbable responses, and/or used as input into a machine learning method that selects responses.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
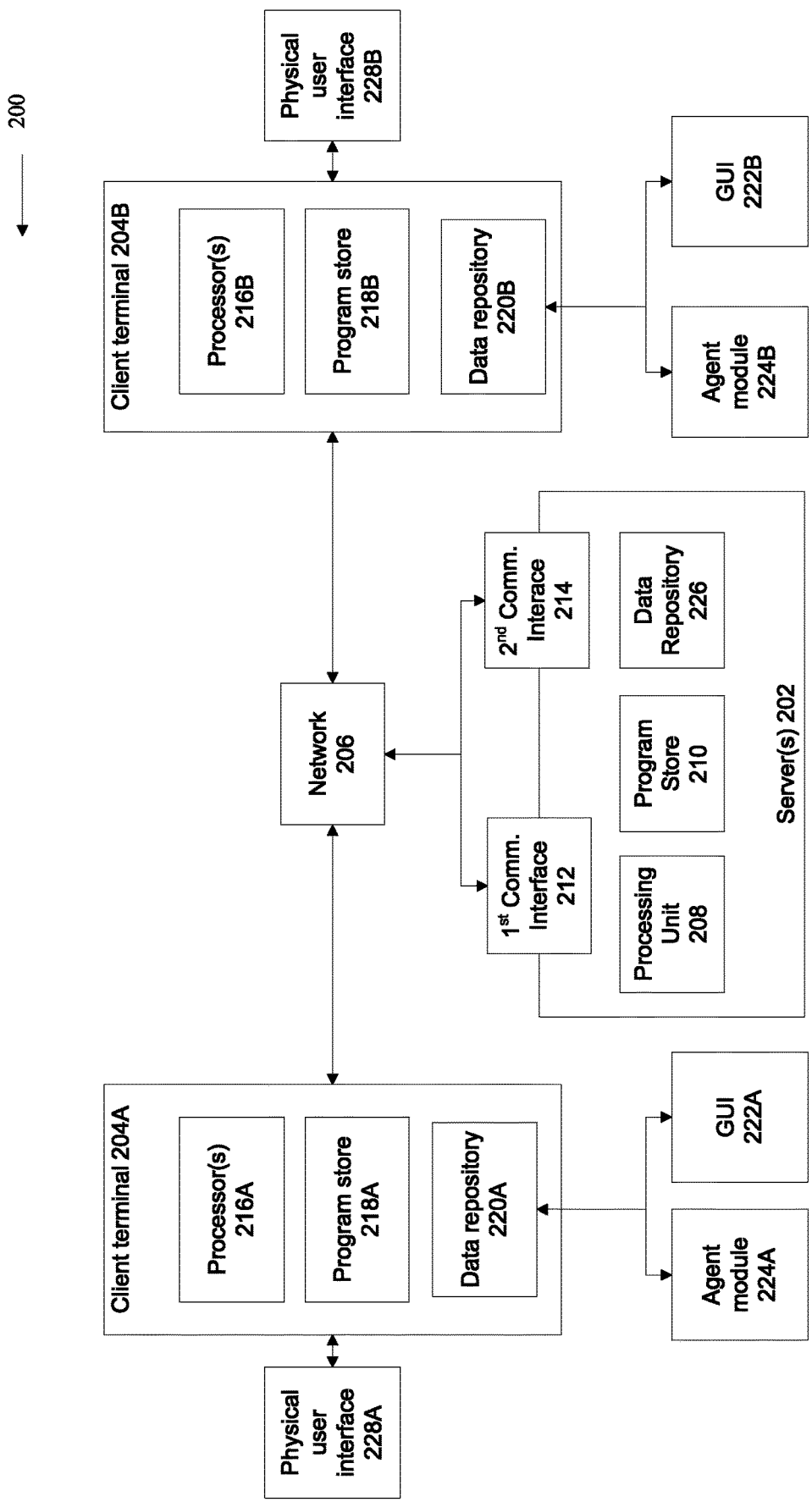
FIG. 2 is a block diagram of a system, including a server, that centrally screens communication sessions to the callee client terminal, in accordance with some embodiments of the present invention.

Reference is now made to FIG. 1, which is a flowchart of a method for centralized screening of communication sessions to a callee client terminal, performed by a network server, in accordance with some embodiments of the present invention. Reference is also made to FIG. 2, which is a block diagram of a system, including a server that centrally screens communication sessions to the callee client terminal, in accordance with some embodiments of the present invention. The method and/or system and/or sever allow for screening to be performed without consideration of the actual real-time status of the callee client terminal (e.g., independently of whether or not the callee is available or unavailable), and/or without involving the callee client terminal in the real-time screening (e.g., without asking the callee client terminal in real-time how to handle the screen).

The systems and/or methods described herein relate to a network server that executes a set-of-rules that define a communication protocol for handling network communication between different network connected client terminals. The set-of-to rules define when to establish a communication session (over the network) between a caller client terminal and a callee client terminal, and when to block or reject establishment of the communication session. When the set-of-rules define rejection of the establishment attempt, the set-of-rules further define the manner in which the rejection is conveyed back to the callee client terminal.

The systems and/or methods described herein may relate to the technical problem of controlling establishing of a communication session over a network connection between a callee client terminal and a caller client terminal. The control of whether or not to establish the communication session, and the reply to the caller client terminal (in the case of rejection of the establishment of the communication) is implemented by a network server in communication with the callee and caller client terminals over the network.

The systems and/or methods described herein may improve performance of the callee client terminal, and/or the communication network (e.g., the segment between the server and the callee client terminal), for example, in terms of processing resources, network resources (e.g., bandwidth), and/or storage requirements. The improvement in performance related to the network may occur, for example, when the server rejects establishment of the communication session (between the caller and callee client terminals), which allows for the network resources between the server and the callee client terminal to be used for other purposes (i.e., since the server block the communication session, instead of, for example, allowing the communication session request to propagate to the callee client terminal). The improvement in performance at the callee client terminal may occur, for example, when the server prevents the request from reaching the callee client terminal, allowing the resources of the callee client terminal to be used for other purposes such as making other calls or performing other processing functions, instead of, for example, handling the incoming requests.

System 200 includes one or more servers 202 that perform centralized screening of a communication between client terminal 204A (also referred to herein as a caller device or caller client terminal) and client 204B (also referred to herein as a callee device or caller client terminal) over a network 206.

Client terminals 204A-B may be, for example, a mobile device, a Smartphone, a Tablet computer, a wearable computer (e.g., watch, glasses), a desktop computer, a laptop, or other device with communication capabilities.

Callee client terminal 204B is a registered subscriber of the centralized screening service provided by server 202. Callee client terminal 204B may have installed thereon agent module 224B for communication with server 202, to define one or more parameters related to the screening. Caller client terminal 204A may not necessarily be a registered subscriber to the centralized screening server. As such, caller client terminal 204A does not necessarily have agent module 224A installed thereon. When caller client terminal 204A is not a registered subscriber, caller client terminal 204A may be, for example, a simple telephone using a landline, and/or a simple mobile phone (e.g., without internet connectivity).

Network 206 may be, for example, a landline telephone network, a wireless telephone network, a wireless data network, the internet, a private network, and/or combinations thereof. Network 206 transmits the voice communication, at least in part, over a packet network, for example, using voice over internet protocol (VoIP), or other protocols.

Server 202 may be, for example, a central server, a proxy server, a router, a gateway, an edge device (e.g., within a radio access network), a network backbone device (e.g., within the network backbone), and/or other network connected computing units. Server 202 includes a processing unit 208, for example, a central processing unit (CPU), a graphics processing unit (GPU), field programmable gate arrays (FPGA), digital signal processor (DSP), and application specific integrated circuits (ASIC). Processing unit 208 may include one or more processors (homogenous or heterogeneous), which may be arranged for parallel processing, as clusters and/or as one or more multi core processing units.

Server 202 includes a program store 210 storing code implementable by processing unit 208, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Server 202 may include multiple computers (having heterogeneous or homogenous architectures), which may be arranged for distributed processing, such as in clusters. Servers 202 may be distributed at different locations within network 206, for example, at strategic points to screen communication sessions, such as before a network bottleneck link (i.e., as screening the session prevents establishment of the link from the server to the callee).

Server 202 includes a first communication interface 212 for communicating with caller client terminal 204A, and a second communication interface 214 for communicating with callee client terminal 204B, as described herein. Server establishes separate segments to each of client terminal 204A and 204B via respective communication interfaces. Interface 212 and 214 may be integrated into a common interface. Interfaces 212 and 214 may be physical interfaces and/or virtual interfaces that provide communication with network 206.

Server 202 may include or be in communication with a data repository 226 for storing data and/or code implementable by processing unit 208, for example, storing the set-of-rules and/or instructions received from agent module 224B of client terminal 204B, as described herein.

One or both client terminals 204A-B include one or more respective processors 216A-B that implement code stored in a respective program store 218A-B, as described herein. Optional respective data repositories 220A-B store data and/or code implementable by the processor, for example, a graphical user interface (GUI) 222A-B as described herein, and/or agent module 224A-B, as described herein. As discussed herein, it is noted that caller client terminal 204A may be a simple phone.

Client terminals 204A-B include and/or are in communication with one or more respective physical user interfaces 228A-B, for example, a display, a touch screen, a microphone, a speaker, a keyboard, a mouse, and/or voice activated interface.

Figure 3:
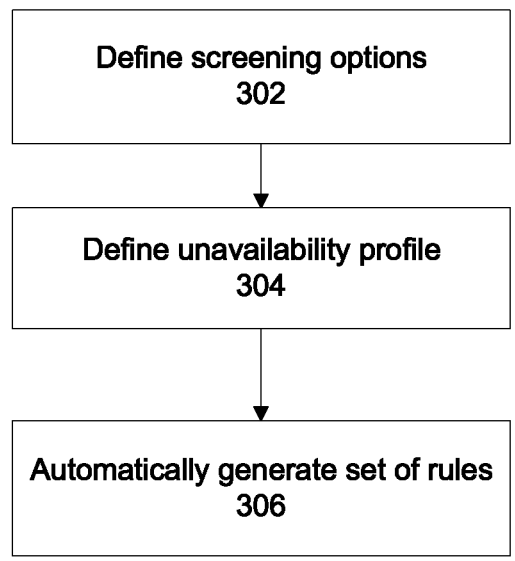
FIG. 3 is a flowchart of a method for defining the screening set of rules, in accordance with some embodiments of the present invention.

Blocks of the method of FIG. 1 and/or the method of FIG. 3 may be represented as instructions by code stored in program store 210, implementable by processing unit 208 of server 202, as described herein.

At 102, a screening set of rules is defined. Alternatively or additionally, one or more screening responses (i.e., for transmission to the callee client terminal) are defined. The screening set of rules may define selection of the screening responses, as described herein.

The screening set of rules and/or the screening responses may be stored in data repository 226 (and/or in another local and/or remote storage device), for example, in a database, a set of records, and/or other suitable data structures.

The screening set of rules may be automatically generated (as described herein), and/or manually entered by a user of the callee client terminal, for example, using agent module 224B, GUI 222B, and/or directly accessing an application on server 202, using physical user interface 228B (e.g., by typing in the data).

The screening set of rules may be defined, for example, as a black list (i.e., to screen predefined callers), as a white list (i.e., to allow predefined callers), as a function (e.g., to screen all calls within a predefined time), and/or using other mechanisms (e.g., as described herein).

Reference is now made to FIG. 3, which is a flowchart of a method for defining the screening set of rules, in accordance with some embodiments of the present invention. The method defines different screening responses available to provide to the caller, an unavailable profile that defines the set of rules, and/or automatically generates the set of rules. It is noted that the set of rules may be manually entered by the user of the callee device, as discussed herein.

At 302, different screening responses are defined, for example, unanswered rings, a busy tone, a tone indicating the phone is off, forward to voice mail, playing an recording with an audio message, sending a text message in response, a tone indicating the callee is on another line, emulation of a wrong number, and/or emulation of a bad connection. Screening responses may be defined per callee client terminal (e.g., customized responses), and/or as a set (or part thereof) available for all (or some) client terminals to use.

The screening responses may be defined independently of the set of rules and/or dependent on the set of rules. The screening responses are provided to the caller, according to the set of rules. The screening responses may be defined to simulate unavailability of the caller to the callee, rather than, for example, making the callee aware that he/she is being screened. For example, multiple unanswered rings, or a message indicating that the phone is out of service may assist in making the callee think that the caller is actually unavailable rather than screening calls. As opposed to, for example, a couple of rings followed by a hang-up tone, which indicates that the caller has manually screened the call.

The screening response may include establishment of a communication session and emulating unsuitability for conducting the communication session. The communication session is established between the caller and the intended callee. The communication session emulates an unsuitable connection, for example, with a dropped call shortly after the establishment, intrusive background noise, an echo of the transmitted conversation, low volume, and/or poor quality (e.g., significant number of dropped packets).

The screening response may include establishment of the communication session with another different client terminal, other than the actual intended caller. The communication session may emulate a mistake in the communication address of the caller, such as an incorrect phone number. The communication session is established with, for example, a predefined client terminal operated by a human operator (e.g., an employee of the screening service) that emulates a user having the same communication address of the intended callee to emulate, for example, a change in number, a client terminal emulated by the server (e.g., an automated phone system) to emulate a wrong number, a randomly selected communication address to emulate a connection error, and a communication address similar to the intended callee address (e.g. phone number differs by one digit) to emulate a typing error.

Optionally, the set of rule define that the screening response is independent of the actual state of the callee client terminal, for example, based on the emulated unavailable profile. The actual state of the callee client terminal may be identified by the server. Alternatively, the set of rules defined that the screening response is based on the real-time usage state of the callee, optionally without involving the callee (e.g., without informing the callee and/or without requesting instructions from the callee). In such a case, the set of rules may define a screening response that is different that the screening response that would be provided as a default by the communication system. For example, when the real-time usage state of the callee is indicative that the callee is in another communication session (e.g., another phone call) with another client terminal, rather than providing the default tone indicating the callee is on another line, the screening response may include multiple unanswered rings. The unanswered rings may be a better screen than the tone indicating the line is busy, since the caller may be less likely to call back thinking the callee is away, rather than trying again in a few minutes to see if the callee is now free.

At 304, an emulated unavailable profile is defined for each callee client terminal. The emulated unavailable profile may be stored in data repository 226 (and/or other local and/or remote storage devices), for example, as a database, and/or other datasets.

The emulated unavailable profile includes an emulation of non-available activities that the user of the callee client device is performing, at least at the time the request is received (and for which the screening response is provided). The emulated unavailable profile emulates unavailability of the callee when the callee is actually available. The emulated unavailable profile may emulate unavailability of the callee independently of the actual available state of the callee (i.e., whether or not the callee is actually available). For example, the unavailable profile may indicate the callee is in a work related meeting, when the callee is available during lunch time. In another example, the unavailable profile may indicate that the callee is out of town, when the callee is actually at home. In yet another example, the unavailable profile may indicate that the callee is asleep, when then callee is actually awake.

The emulated unavailable profile may be manually entered (e.g., by the user of the callee client terminal) via physical user interface 228B using GUI 222B and/or agent module 224B, and/or automatically generated.

The emulated unavailable profile may be automatically learned based on an analysis of actual user non-available activities. The analysis may be performed on identified non-available entries in a calendar application installed on the callee client terminal, for example, by agent module 224B accessing the local calendar application and transmitting the non-available entries to the server.

The emulated unavailable profile may include an emulation of the presence of the callee client terminal at a geographical location with unavailable or low quality connectivity, for example, abroad, on a boat, on a plane, in a tunnel, in a city at a location with poor connectivity, in a forest, camping, and/or at a rural location.

The emulated unavailable profile may include an emulation of the unavailability of the callee client terminal due to being abroad when the callee client terminal is actually local and available.

The emulated unavailable profile may include block(s) of time manually defined by a user of the callee client terminal, for example, the user may decided to screen calls from 18:00-20:00.

The emulated unavailable profile may be defined (e.g., repeated for each definition), for example, for each day, for each day of the week, for weekends vs. work days, for holidays, and/or other days.

The set of rules and/or screening responses may be related to the emulation profile. For example, when the emulation profile indicates that the callee client terminal is in a meeting, the screening response may be a forward to voice mail. When the emulation profile indicates that the callee client terminal is in a location with a poor network connection, a poor network connection may be emulated. When the emulation profile indicates that the callee client terminal is sleeping, the phone may ring without being answered.

At 306, the set of rules may be automatically created, for example, by a machine learning processes having code stored in program store 210 and implemented by processing unit 208.

The machine learning process may receive as input for analysis, a history of manual user actions of the user of the callee client terminal in response to incoming calls from different caller client terminals, for example, which incoming calls the user answered and which incoming calls the user did not answer. The analysis may include when the user answered calls and when the user did not answer calls. The machine learning may identify patterns of which calls the user screens and/or when the user screens calls, and automatically generates the set-of-rules according to the analysis.

The history of manual user actions may includes messaging service responses, for example, the user not answering the call and sending a text to the caller instead. The machine learning analysis may analyze the text message responses, and create the set-of-rules and/or screening responses to automatically reply with a message emulating a response of the user. For example, the user may reply with "busy", "in a meeting", or "can't talk, will call later". The screening responses may be defined based on common user responses, to emulate the responses by the user. Such screening responses may be customized per user.

At 104, a request from a caller client terminal (e.g., 204A) to establish a communication session with a callee client terminal (e.g. 204B) is received by a server (e.g., 202), optionally via communication interface 212. For example, the caller client terminal dials a phone number of the callee client terminal (e.g., for voice and/or video calls), sends a message (e.g., an instant message (IM), and/or short message service (SMS)), and/or other communication medium.

The request is forwarded and/or routed by network 206 to server 202 for processing, for example, by network 206. The request may be received by server 202 without being received by callee client terminal 204B. Network 206 may route the request to network 206 instead of to callee client terminal 204B, for example, according to predefined network instructions (e.g., routing tables).

Server 206 communicates with caller client terminal 204A over a first communication segment that is different than a second communication segment used by server 206 to communicate with callee client terminal 204B. The request is received over the first segment. The second segment may or may not be established by the server.

The callee client terminal may be defined by the server as a registered user, for example, according to a database of registered users stored in data repository 226 (and/or in other local and/or remote storage devices). The portion of the communication session (i.e., the communication segment) between the server and the callee client terminal may or may not be established by the server, according to the set of rules. As such, when the set of rules define providing a screening response to the caller, the second segment between the callee and the server may not necessarily be established, or may be established to emulate a poor connection (as described herein). When the set of rules define allowing the request to proceed, the server may establish the second segment with the callee, and link the caller and the callee over the first and second segments to establish the communication session.

Optionally, the caller client terminal and the callee client terminal are respectively in communication with the server over at least a portion of the network that includes a packet network (e.g. the internet). The server may or may not establish the communication session as a voice over packet network phone call. It is noted that plain old telephone service (POTS) links may be used in conjunction with network links, for example, the caller may call using a regular phone using POTS, while the callee has a smartphone connected to the server using a network connection.

Server 206 may coordinate screening responses from one or multiple callers client terminals to one or multiple callee client terminals.

When server 206 processes the requests and response with respective screening responses, the requests are not transmitted to the callee and/or the callee is not prompted to provide other instructions for the response. The communication interface resources of the callee client terminal are free (while the server processes the request from the caller client terminal), allowing establishing another communication session between the callee client terminal and another client terminal (i.e., different than caller 204A).

At 106, the request is analyzed according to the screening set-of-rules. The analysis may be performed by server 202, using the screening set of rules stored in a database of data repository 226. The screening set of rules may be retrieved from the database according to the callee client terminal when each client terminal is associated with a customized set of rules.

The set of rules are applied to determine when to screen the callee (e.g., block 108), and when to allow establishment of the communication session (block 114). The set of rules may be evaluated to arrive at the decision of screening or allowing the session to be established (e.g. TRUE or FALSE, DECISION 1 or DECISION 2, or other results).

The set of rules may be, for example, a script, coded instructions, a record of values for defined parameters, and/or other data structures. The set of rules may be based on the unavailable profile (to determine the current emulated activity of the callee), based on manually entered information by the callee, based on black lists, based on white lists, and/or other variables, for example, as described herein.

The analysis (and the transmitting with reference to block 110) may be performed by the server independently of the real-time status of the callee client terminal and/or without receiving real-time response instructions from the callee client terminal. Data related to the request may not be transmitted to the callee client terminal. Alternatively, the real-time status of the callee client terminal is taken into consideration, for example, the response is transmitted in view of the real-time status, optionally different than the real-time status. For example, when the callee is on another line, the response provided may indicate that the callee is not available for calls (e.g., unanswered rings).

At 108, the screening response is selected when the evaluated set of rules are indicative of screening the caller client terminal.

Optionally, the screening response is selected from a group of available screening responses. The selection may be random, on a rotational basis, based on previous selected responses, based on the unavailability profile, based on manually entered user preferences, based on machine learning, and/or other variables, for example, as described herein.

Different screening responses may be selected to provide to different requests from the same caller client terminal. The different screening responses may be selected in view of one another. The different screening responses may be selected to emulate non-availability of the callee to the caller. For example, when the same caller client terminal sends multiple requests over time (e.g., tries to call several times in a row, close together in time and/or with significant time between each request), different screening responses may be selected such as unanswered rings, straight to voice mail, and a bad connection, instead of, for example, repeating the same screening response. Repeating the same screening response may make the caller suspect that the callee is screening the calls, for example, since one may not expect to receive the same response multiple times at different times and/or dates. Providing different screening responses may better emulate unavailability, for example, since one may expect the callee to be unavailable in different ways at different times and/or dates.

The different screening responses may be selected according to a logged history of previous responses (e.g., logging as described with reference to block 112). The newly selected response may be selected to prevent repeating the same screening response. It is noted that the same response may be repeated in a controlled manner, for example, at night, unanswered rings may be provided.

The screening response may be selected according to the emulated unavailable profile of the callee client device. For example, when the emulated profile indicates that the user is at work, the response may be indicative of a phone shut off. When the profile indicates the user is travelling, the response may be a bad connection. When the profile indicates the user is taking a nap, the response may be a forward to voice mail. When the profile indicates the user is at a baseball game, the response may be unanswered rings.

Optionally, the screening response is selected according to an identified relationship type between the caller and the callee. For example, when the relationship type is colleagues, the response may be unanswered rings. When the relationship type is friends, the response may be a bad connection. When the relationship type is boss-worker, the response may be a forward to voice mail. The relationship type may be automatically determined, for example, by code that accesses a social network website of one or both of the client terminals to extract the relationship type, by code that accesses applications installed on the client terminal (e.g., a phone book identifying relationships), and/or other methods. The mapping between relationship type and response may be automatically and/or manually defined. The mapping may be stored in data repository 226.

The screening response may be selected according to the machine learning, for example, the text to provide in a response IM is selected according to the trained machine processes, as described herein.

At 110, the selected screening response is provided (e.g., transmitted) to the caller client by the server. The server may emulate that the callee is unavailable for a phone call (e.g., unanswered rings, busy signal, forward to voice mail) and/or emulate a poor communication session (e.g., dropped calls, low volume), and/or emulate an incorrect communication session address (e.g., emulate a wrong number by emulating a different client terminal).

The screening response transmitted by the server to the caller client terminal may be different than the real-time usage state of the callee client terminal, as described herein.

At 112, a history of communication session request data and/or associated transmitted screening responses may be logged. Information logged may include one or more of, for example, the requesting calling client terminal, the callee client terminal, the time of the request, the date of the request, and/or the provided response.

The logging may be performed by sever 202, within a log (e.g., file, database, set of records) in data repository 226 (and/or other local and/or remote storage devices).

The log may be analyzed to select the screening response, for example, as described herein, such as to prevent transmission of the same response multiple times in a row to the same caller client terminal. The log may be used as a training set by a machine learning process to improve selection of the screening responses. The log may be analyzed to automatically generate and/or update the set of rules. The log may be accessible by the user of the client terminal (e.g. using a physical user interface via the GUI and/or the agent module), for example, to view who was screened and/or the response provided as part of the screening.

Alternatively, at 114 the communication session is established between the caller client terminal and the client caller terminal (instead of screening as in block 108), according to the set of rules (i.e. analyzed at block 106). The server may perform the communication establishment.

The server may establish a communication segment with the caller client terminal, and establish the communication session over the other segment with the caller linked to the segment with the callee.

Optionally, the established communication session is logged in the log, as described with reference to block 112. Logging both cases of the established sessions and the provided screening responses may be used, for example, to train a machine learning method, such as a statistical classifier, with different category inputs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant servers and communication session protocols will be developed and the scope of the terms server and communication session is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed to composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for centralized screening of a communication session, comprising:
   receiving, at a server, a request from a caller client terminal, to establish a communication session with a callee client terminal;
   analyzing, by the server, the request according to a screening set-of-rules; and
   transmitting, from the server, a first screening response to the caller client terminal according to the analysis;
   wherein the analyzing and the transmitting are performed by the server independently of real-time response instructions from the callee client terminal;
   wherein the first screening response is selected from a group of screening responses to provide to the request; and
   wherein, upon detecting that the same caller client terminal issues a plurality of requests, for each subsequent request, a different screening response than a previously selected screening response is selected from the group of screening responses, to provide to the subsequent request.

2. The method of claim 1, wherein independently comprises without transmitting data related to the request to the callee client terminal.

3. The method of claim 1, wherein the callee client terminal is a registered user of the server, wherein a portion of the communication session between the server and the callee client terminal is established by the server.

4. The method of claim 1, further comprising logging a history of communication session request data and associated transmitted screening responses, and selecting the different screening responses according to the logged history to prevent repeated same screening responses.

5. The method of claim 1, further comprising selecting a certain screening response from a group of screening responses according to an emulated unavailable profile of the callee client device, the emulated unavailable profile including a emulation of non-available activities that a user of the callee client device is performing at least at the time the request is received.

6. The method of claim 5, wherein the emulated unavailable profile is automatically learned based on an analysis of actual user non-available activities.

7. The method of claim 5, wherein the emulated unavailable profile is automatically generated based on an analysis of non-available entries in a calendar application installed on the callee client terminal.

8. The method of claim 5, wherein the emulated unavailable profile includes an emulation of the presence of the callee client terminal at least at one geographical location with unavailable or low quality connectivity.

9. The method of claim 5, wherein the emulated unavailable profile includes an emulation of the unavailability of the callee client terminal due to being abroad when the callee client terminal is actually local and available.

10. The method of claim 5, wherein the emulated unavailable profile includes at least one block of time manually defined by a user of the callee client terminal.

11. The method of claim 1, wherein the screening response transmitted by the server to the caller client terminal is different than a real-time usage state of the callee client terminal.

12. The method of claim 11, wherein the screening response includes a plurality of unanswered rings when the real-time usage state includes another active communication session between the callee client terminal and a third client terminal.

13. The method of claim 1, wherein the screening response includes establishment of the communication session between the caller client terminal and the callee client terminal, and emulating a dropped call after establishment of the communication session.

14. The method of claim 1, wherein the screening response includes establishment of the communication session between the caller client terminal and the callee client terminal, and emulating a low quality communication session insufficient for complete transmission of voice data over the established communication session.

15. The method of claim 1, wherein the server coordinates screening responses for a plurality of callee client terminals.

16. The method of claim 1, further comprising performing a machine learning analysis of a history of manual user actions of a user of the callee client terminal in response to incoming calls from caller client terminals, and automatically generating the set-of-rules according to the analysis.

17. The method of claim 16, wherein the history of manual user actions includes a plurality of messaging service responses, and the machine learning analysis creates the set-of-rules to automatically reply with a message emulating a response of the user.

18. The method of claim 1, further comprising: automatically determining a relationship type between the caller and the callee, and selecting the screening response according to the relationship type.

19. The method of claim 1, wherein the screening response includes routing the request to another client terminal different than the callee client terminal, to establish a communication session with the other client terminal, emulating a mistaken communication address of the callee client terminal.

20. The method of claim 19, wherein the another client terminal is selected from the group consisting of: a predefined client terminal used by a human operator that emulates a mistaken user, a randomly selected client terminal, and a client terminal having a communication address similar to a communication address of the callee client terminal.

21. The method of claim 1, wherein the screening response includes emulating establishment of the communication session with an incorrect client terminal emulated by the server, emulating a mistaken communication address of the callee client terminal.

22. A system for screening of a communication session, comprising:
- a server comprising:
  - a first communication interface for communicating with a caller client terminal;
  - a second communication interface for communication with a callee client terminal;
  - a program store storing code;
  - a processor coupled to the first communication interface, the second communication interface, and the program store for implementing the stored code, the code comprising:
    - code to receive, using the first communication interface, a request from a caller client terminal to establish a communication session with a callee client terminal, to analyze the request according to a screening set-of-rules; and
    - to transmit using the first communication interface, a first screening response to the caller client terminal according to the analysis;
  - wherein the analyzing and the transmitting are performed by the server independently of real-time response instructions from the callee client terminal;
  - wherein the first screening response is selected from a group of screening responses to provide to the request; and
  - wherein, upon detecting that the same caller client terminal issues a plurality of requests, for each subsequent request, a different screening response than a previously selected screening response is selected from the group of screening responses, to provide to the subsequent request.

23. The system of claim 22, wherein the request is received over a first communication segment between the caller client terminal and the server, the request including establishing of a second communication segment between the callee client terminal and the server and providing communication between the caller client terminal and the callee client terminal using the server using the first and second communication segments.

24. The system of claim 22, wherein communication interface resources of the callee client terminal are free while the server processes the request from the caller client terminal allowing establishing a second communication session between the callee client terminal and a third client terminal.

25. The system of claim 22, wherein the caller client terminal and the callee client terminal are connected to the server over a packet network, and the server attempts to establish the communication session as a voice over packet network phone call.

26. A computer program product comprising a non-transitory computer readable storage medium storing program code thereon for implementation by a server, the program code comprising:
- instructions to receive a request from a caller client terminal to establish a communication session with a callee client terminal;
- instructions to analyze the request according to a screening set-of-rules; and
- instructions to transmit a first screening response to the caller client terminal according to the analysis;
- wherein the analyzing and the transmitting are performed independently of real-time response instructions from the callee client terminal;
- wherein the first screening response is selected from a group of screening responses to provide to the request; and
- wherein, upon detecting that the same caller client terminal issues a plurality of requests, for each subsequent request, a different screening response than a previously selected screening response is selected from the group of screening responses, to provide to the subsequent request.

* * * * *